United States Patent

Angel

[15] 3,638,227

[45] Jan. 25, 1972

[54] AUTOMATIC THRESHOLD PLOTTER
[72] Inventor: Henry R. Angel, Trumbull, Conn.
[73] Assignee: General Science Corp., Bridgeport, Conn.
[22] Filed: Apr. 28, 1970
[21] Appl. No.: 32,524

[52] U.S. Cl. .................................346/1, 324/71 R, 346/29
[51] Int. Cl. ....................................G01d 9/40, G06m 11/00
[58] Field of Search ........................346/29, 33 A; 73/432 PS; 235/92 PC; 324/71 CP, 71 LC, 71 R; 356/102, 39, 40

[56] References Cited

UNITED STATES PATENTS

| | | | |
|---|---|---|---|
| 3,094,625 | 6/1963 | Hendrick | 356/102 |
| 3,279,305 | 10/1966 | Muta et al. | 356/102 |
| 3,331,950 | 7/1967 | Coulter et al. | 235/92 PC |
| 3,377,597 | 4/1968 | Muta | 356/102 |
| 3,392,331 | 7/1968 | Coulter | 324/71 PC |

Primary Examiner—Joseph W. Hartary
Attorney—Weingarten, Maxham & Schurgin

[57] ABSTRACT

An automatic threshold plotter for use with a particle-counting system in which, during a single analytical run, a plot is provided of particle count rate as a function of threshold voltage from which particular threshold settings can be readily determined.

6 Claims, 9 Drawing Figures

PATENTED JAN 25 1972 3,638,227

INVENTOR
HENRY R. ANGEL
BY Joseph Weingarten
Stanley M. Schurgin
ATTORNEYS

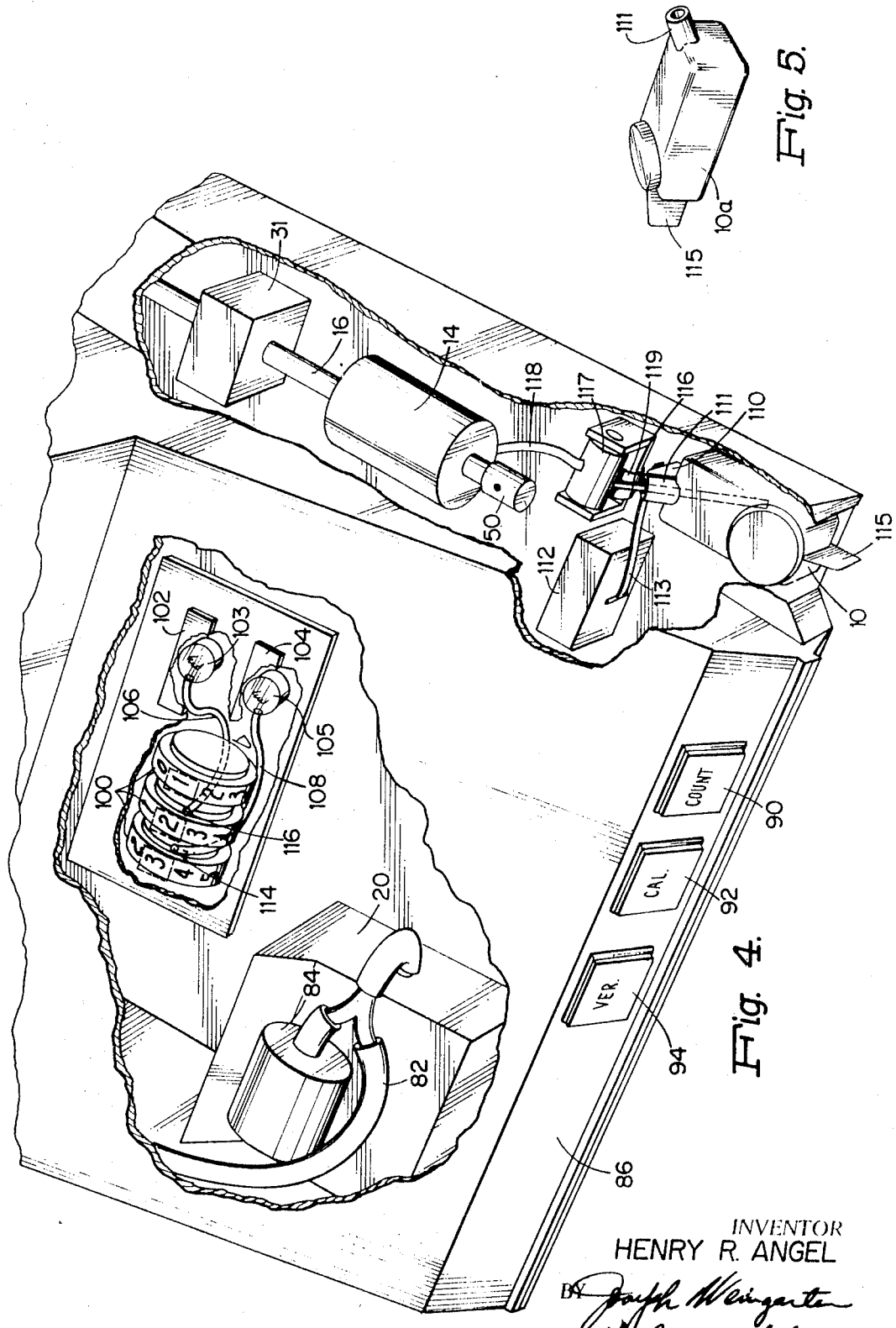

INVENTOR
HENRY R. ANGEL
ATTORNEYS 3,638,227

1

AUTOMATIC THRESHOLD PLOTTER

FIELD OF THE INVENTION

This invention relates to particle-counting systems and more particularly to means for automatically plotting threshold curves for such systems.

BACKGROUND OF THE INVENTION

Systems for the counting of particles suspended within a liquid generally include a pair of electrodes disposed within a fluid path and having an aperture disposed therebetween through which the particle-containing fluid is caused to flow. The impedance of the fluid path as sensed by the electrodes is materially altered by the presence of a particle within the aperture, giving rise to electrical pulses which can be electrically counted and which correspond to the number of particles passing through the aperture. It is usually desirable and necessary to discriminate between pulses attributable to a particle within the aperture and those signals attributable to noise or spurious conditions, and threshold circuitry is usually provided to determine a level above which signals will be passed for subsequent processing. The threshold level should be set at a value sufficiently high to discriminate against spurious pulses and yet not so high as to discriminate against smaller amplitude count pulses. The proper threshold level for a particular system has heretofore been determined by conducting a series of analytical runs on a particle-containing sample, each run being conducted at a different threshold level. The sample contains a known number of particles per unit volume and this known count can be correlated with the plurality of counts taken at the several threshold settings in order to select that threshold level which provides the most accurate count. It will be appreciated that such a threshold-determining procedure is extremely time consuming and does not lend itself to efficient utilization of pulse-counting systems or of the associated operating personnel.

SUMMARY OF THE INVENTION

In accordance with the present invention, an automatic threshold plotter is provided in which, from only a single analytical run, a plot of count rate versus threshold voltage is provided for ready determination of appropriate threshold setting. In brief, the automatic plotter includes circuitry for providing, in response to electrical pulses from the pulse-counting system, signals representative of pulse count rate. These count rate signals are applied to one axis of a two-axis plotter, while a variable voltage is applied to the other plotter axis. This variable voltage typically is derived from a ramp generator which sweeps across a range of voltages which include all possible threshold settings for the particular counting system in question. A plot of count rate as a function of threshold level is thereby provided from which particular threshold settings are readily determined.

DESCRIPTION OF THE DRAWINGS

The invention will be more fully understood from the following detailed description taken in conjunction with the accompanying drawings, in which:

FIG. 4 is a cutaway pictorial view of sample flask-coding apparatus embodied in the particle-counting system;

FIG. 5 is a pictorial view of a sample flask useful in the system;

2

Figure 8:
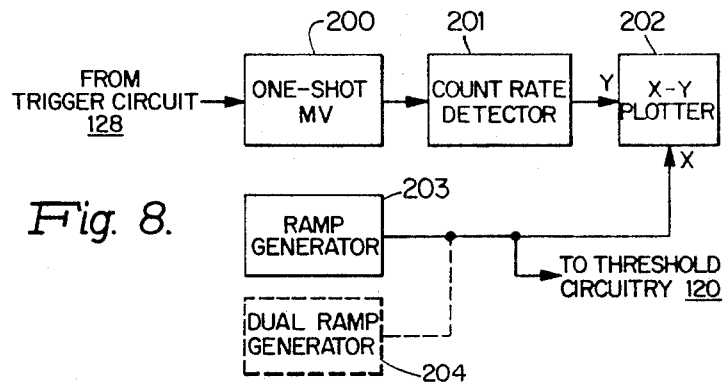
FIG. 8 is a block diagram of a threshold-plotting system according to the invention.
Figure 9:
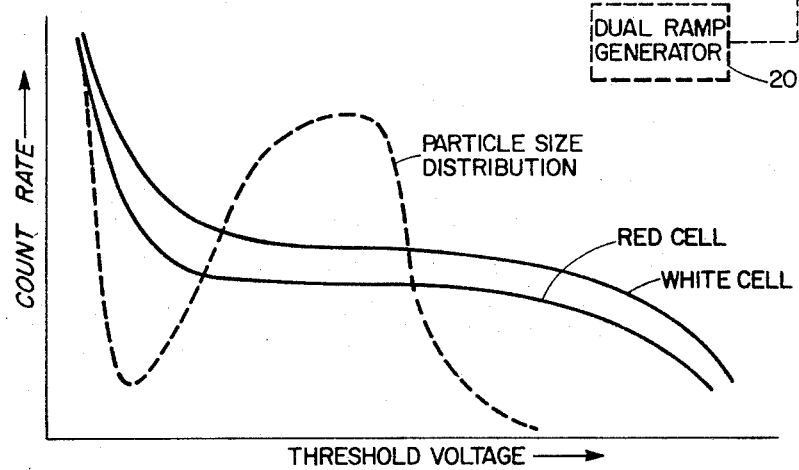

FIG. 9 is a plot of typical threshold curves provided by the system of FIG. 8.

DETAILED DESCRIPTION OF THE INVENTION

Before considering the automatic threshold plotter in detail, it will be helpful to discuss a typical particle-counting system with which the invention is useful. The system itself is the subject of copending U.S. Pat. application, Ser. No. 32,582, filed Apr. 28, 1970 and assigned to the assignee of the present invention.

Figure 1:
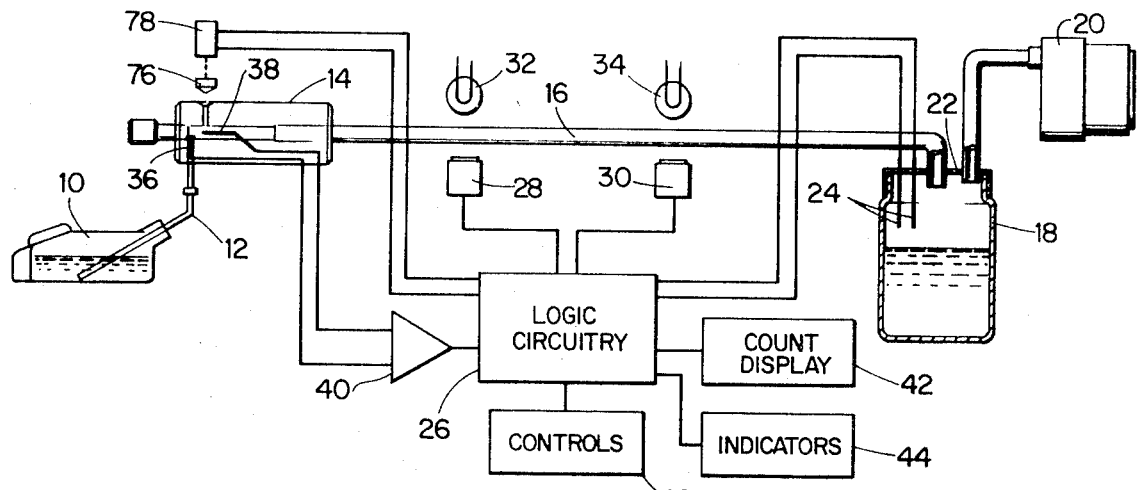
FIG. 1 is a diagrammatic representation of a particle-counting system useful with the invention.

A particle-counting system which is especially adapted for counting blood cells is illustrated in diagrammatic form in FIG. 1. The particles to be counted are suspended within a liquid contained within a sample flask 10, and fluid is drawn from flask 10 into the system by means of a tube 12. The particle-containing fluid is drawn from flask 10 by way of tube 12 to the input orifice of a conductivity cell 14 which includes a pair of electrodes with an aperture disposed therebetween and through which the fluid to be analyzed flows. The conductivity cell per se will be described in detail hereinafter.

Conductivity cell 14 is coupled to a flow tube 16 which terminates in a waste bottle 18. A suction pump 20 is also coupled to waste bottle 18 through a suitably sealed stopper 22 and is operative to draw sample fluid from flask 10 through conductivity cell 14 and flow tube 16 for analysis. A pair of electrodes 24 are disposed within waste bottle 18 and are coupled to logic circuitry 26 for the detection of a predetermined upper level of waste fluid within bottle 18 to prevent overflow of waste fluid from the bottle and to also prevent the entry of waste fluid into suction pump 20.

A first photosensor 28 is disposed adjacent flow tube 16 at a predetermined position along the length thereof and a second photosensor 30 is similarly disposed with respect to flow tube 16 in a position downstream from the first photosensor 28. Flow tube 16 is formed of a suitable light-transmissive material such as glass and a pair of light sources 32 and 34 are arranged in operative association with respective photosensors 28 and 30. The photosensors are connected to logic circuitry 26 and are employed to provide electro-optical metering of the volume of liquid to be analyzed. In the absence of fluid flowing within tube 16, photosensors 28 and 30 receive light from respective sources 32 and 34. During the passage of fluid within tube 16, however, the respective photosensors 28 and 30 do not receive light from their respective illumination sources. An electrical output signal is thus provided to logic circuitry 26 by photosensors 28 and 30 depending upon the presence of fluid at the sensor locations. The particle-counting operation is commenced and terminated by gating signals provided by this electro-optical metering system. The passage of fluid within tube 16 past photosensor 28 causes a signal to be applied to logic circuitry 26 to commence a counting operation, while the counting operation is terminated upon receipt of a signal from photosensor 30. In this manner, a counting run is accomplished on a metered volume of liquid determined by the internal dimensions of flow tube 16 and the distance between the metering photosensors 28 and 30. The photosensitive-metering technique itself is described in detail in copending U.S. Pat. application, Ser. No. 121,063, entitled Automatic Particle Counting System and assigned to Contraves AG.

The electrodes 36 and 38 of conductivity cell 14 are connected to an input amplifier 40 which is a high-input impedance, low-noise, high-gain operational amplifier. The output of amplifier 40 is coupled to logic circuitry 26 and the logic circuitry is operative to provide an output indication of particle count on a suitable display 42 and to energize suitable alarm indicators 44. Operating controls 46 are coupled to logic circuitry 26 for enabling system operation.

Figure 2:
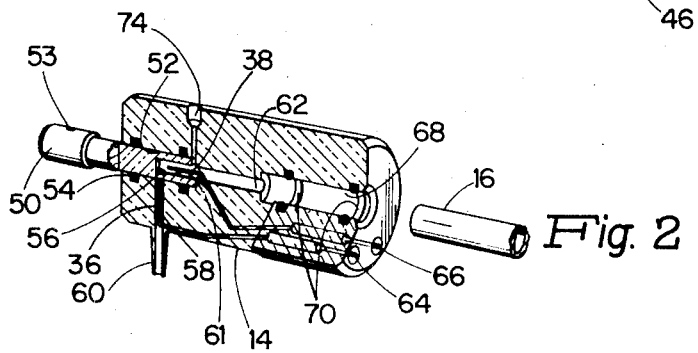
FIG. 2 is a pictorial view, partly in section, illustrating a conductivity cell embodied in the system of FIG. 1.

The conductivity cell through which the sample fluid is caused to flow and in which the changes in impedance caused by the presence of particles within an aperture are detected is illustrated more particularly in FIG. 2. The cell 14 is of generally cylindrical configuration and typically is formed of a plastic material such as plexiglass or other polycarbonate plastic which is inert to the fluids being analyzed and which is electrically insulative. An aperture support 50, also typically formed of the same plastic material, is supported within a cylindrical opening coaxially provided at one end of the cell body 51 and is securely fitted therein such as by O-rings 54. An aperture through which the particle-containing fluid is caused to flow is formed within a ruby element 56 disposed within the side of support 50, with the aperture in alignment with an input passage 58 which communicates with input tube 60. A visual marking 53 is provided on an end of aperture support 50 and is located to indicate aperture alignment when the marking is facing vertically upward.

The aperture within ruby 56 also communicates with an opening 61 formed in the inner end of support 50 and which in turn communicates with a coaxial passage 62 formed within cell body 51. The electrode 36 is disposed within passage 58 and has an end adjacent the aperture element 56 and is connected to an electrical connector 64 formed within body 51. The second electrode 38 is disposed within the opening 61 formed in the end of support 50 and terminates in a second electrical connector 66 also formed within body 51. Electrodes 36 and 38 are typically formed of platinum or other metal inert to the fluid under analysis. Connectors 64 and 66 are coupled by suitable interconnecting wires to input amplifier 40, as illustrated in FIG. 1 and to a source of excitation voltage. The flow tube 16 is coupled to cell 14 by means of a coaxial opening 68 formed in the end of body 51 opposite to support 50 and also containing O-rings 70 for sealing. A passage 72 is coupled to fluid passage 62 and includes an enlarged end portion or port 74 which is cooperative with a plunger 76 (FIG. 1) to provide venting of the cell. The plunger 76 is coupled to and operated by an electrically driven solenoid 78 which is energized by logic circuitry 26.

The construction of conductivity cell 14 permits the easy adjustment of the metering aperture within the fluid passage and also permits relatively easy cleaning and replacement of the aperture within the cell. The entire cell which is easily installed and removed from the system, is electrically connected by means of connectors 64 and 66, and fluid-coupled by simple installation of the cell onto an end of flow tube 16 and of input tube 12 to input passage 60. During operation, fluid-containing particles to be counted is drawn through passage 60, aperture element 56 and thence via passage 62 into flow tube 16. Vent port 74 is closed by plunger 76 during an analytical run so that fluid is drawn by suction pump 20 through the system for the counting of particles therein. After a count has been accomplished, plunger 76 is automatically withdrawn from the associated port 74 to cause air to be drawn into the cell by operation of pump 20. The system is automatically purged after completion of a counting run and is thus in condition for a subsequent analytical run.

Automatic purging of fluid from the cell and the system after an analytical run offers major advantages over particle-counting systems of conventional design. As discussed, opening of the conductivity cell vent after a counting run causes air to be drawn into the cell, with consequent purging of fluid within passages 61 and 62 of cell 14 and within flow tube 16. As a result of this purging operation, no fluid remains within the otherwise conductive path formed between electrodes 36 and 38 and the aperture disposed therebetween, and thus no conduction between electrodes occurs. An excitation voltage applied to the cell electrodes need not therefore be removed, as in conventional systems, since no fluid is present to permit conduction. Excitation is thus continuously applied to the electrodes when the system is energized but conduction within the conductivity cell occurs only during an analytic run.

The absence of conduction after the system is vented also prevents electrolysis and consequent production of gas bubbles during the time between runs. Such lack of conduction also permits the use of smaller electrodes as the conductivity of the electrodes is not materially diminished by formation of gas bubbles on the surface thereof, such as can occur to a greater extent in conventional systems. It should be noted that although residual fluid may remain by capillary action within input passage 58, this residual fluid is not analyzed during a subsequent run since the actual fluid to be analyzed will flow through the cell aperture before a start signal is provided by photosensor 28.

Figure 3:
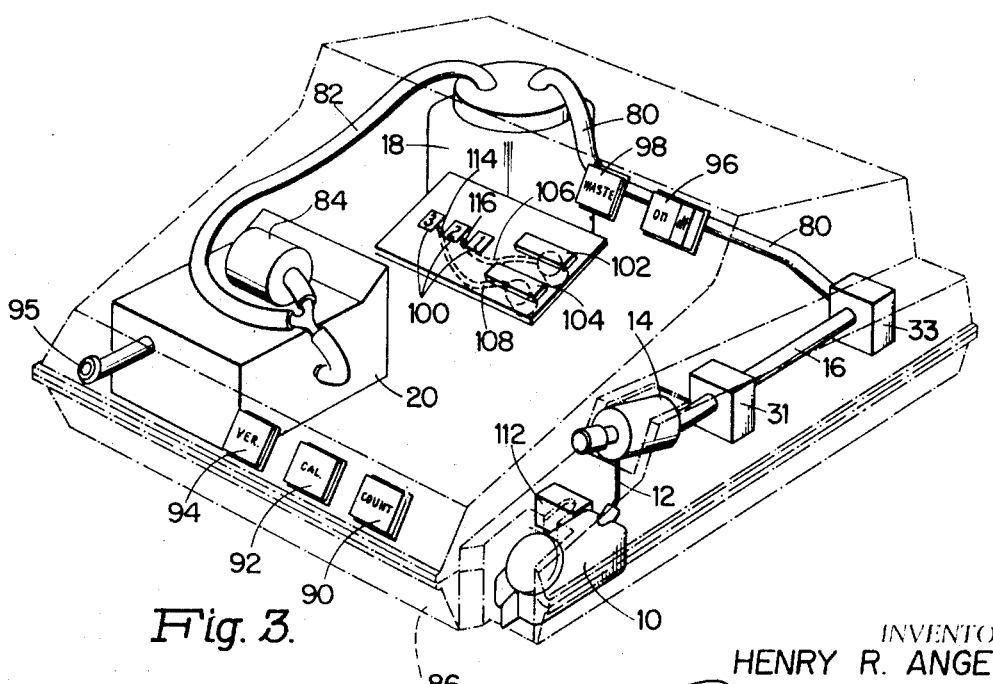
FIG. 3 is a pictorial view, partly in phantom, of a particle-counting system in a typical packaging arrangement.

The novel system is packaged within a compact housing which is of a size and configuration adapted for desk top operation. The general packaging arrangement is illustrated in FIG. 3. The conductivity cell 14 and its associated flow tube 16 are arranged in the illustrated embodiment on the right-hand side of the cabinet 86 with metering photosensors 28 and 30 and associated light sources 32 and 34 being contained within respective housings 31 and 33 disposed around flow tube 16. Tube 16 is coupled via tubing 80 to waste bottle 18 which is also coupled via tubing 82 to suction pump 20 and associated flow regulator 84 for providing a uniform flow rate. The sample flask 10 is inserted within the system in the manner illustrated with input tube 12 disposed within flask 10 for withdrawal of fluid therefrom into cell 14.

The instrument cabinet 86 includes a section on the right-hand side thereof having an opening for simple insertion of sample flask 10, and an upper opening for easy access to aperture support 50 of conductivity cell 14 for the adjustment or replacement of the metering aperture. A nozzle 95 is coupled from pump 20 to the front panel of housing 86 to provide a source of positive air pressure for blowing out support 50 and the aperture therein. Support 50 is placed coaxially onto nozzle 95 to clear the aperture. The controls and indicators are contained on instrument housing 86 and include a count control 90, calibrate control 92, verify indicator 94, on-off control 96 and waste indicator 98. In the illustrated embodiment, the controls are of the self-illuminating pushbutton type.

The particle count is displayed on a three-digit electromechanical counter which includes digital output indicator wheels 100; a white blood cell indicator 102 and a red blood cell indicator 104 are provided to denote which cell count is being displayed and to display the appropriate multiplier for the cell count. Fiberoptic or other light-transmitting cables 106 and 108 are respectively coupled from the lamps associated with indicators 102 and 104 to positions between the digits of indicator 100 to provide selective decimal point indication depending upon whether a red blood cell count or a white blood cell count is being performed. As will be described, the decimal point is automatically set by insertion of an appropriate red cell or white cell flask 10 into the system.

The counter assembly and the decimal point coding arrangement is illustrated in greater detail in FIG. 4. The electromechanical counter is itself well known and includes digit wheels 100 driven by actuating relays. The respective digits being displayed are visible through a suitable window on the instrument housing. The indicators 102 and 104 include a respective appropriately labeled window, as illustrated, and a respective associated light source 103 and 105 disposed therebelow. Fiberoptic cable 106 is coupled between the light source 103 and a position between the second and third digit wheels 100 of the counter. Fiberoptic cable 108 is coupled between light source 105 and a position between the first and second digit wheels of the counter. The light sources 103 and 105 are electrically connected to microswitch 112 which includes an actuating arm 113 adapted to be selectively engaged by a sample flask 10 inserted within the input opening of the cabinet 86. With switch 112 in one position, indicator 102 is illuminated as is decimal point 116 to provide display of a white cell count magnitude. With switch 112 in its second position, indicator 104 and associated decimal point 114 are illuminated to provide suitable display of a red cell count magnitude.

The sample flask 10 is selectively coded for red and white cell counting. The red cell counting flask is coded as illustrated in FIG. 4 with a flange 110 formed on the end thereof near the nozzle 111 and operative to engage the switch arm 113 to cause setting of switch 112 to a position to enable red cell indicator 104 and decimal point 114. The sample flask 10a (FIG. 5) employed for white cell counting does not include the end flange 110, and as a result, with a white sample flask inserted within the instrument, switch 112 remains in a second position causing illumination of white blood cell indicator 102 and associated decimal point 116. For convenience of use, the sample flasks can include a handle 115 and can be color coded for red cell and white cell counting. Typically the red cell and white cell flasks are respectively red and white, and can be respectively prediluted to a predetermined degree such that only a measured quantity of blood need be supplied to the respective flasks to prepare a sample for analysis.

The input tube 116 which is inserted within the sample flask 10 is attached to a block 117 which is pivotally mounted for rotation about an axis defined by mounting screws on the sides thereof. Tube 116 communicates with a passage provided through block 117 and is coupled to cell 14 via a flexible tube 118. In the absence of a flask within the housing, block 117 is maintained in a vertical position by a spring member 119. As a result, input tube 116 extends forwardly in a substantially horizontal disposition for easy insertion into nozzle 111 of a sample flask. After a flask is placed onto tube 116 and is seated within the opening provided within housing 86, block 117 and tube 116 are rotated as illustrated to accommodate for the angular disposition of the input tube within flask 10.

Figure 6:
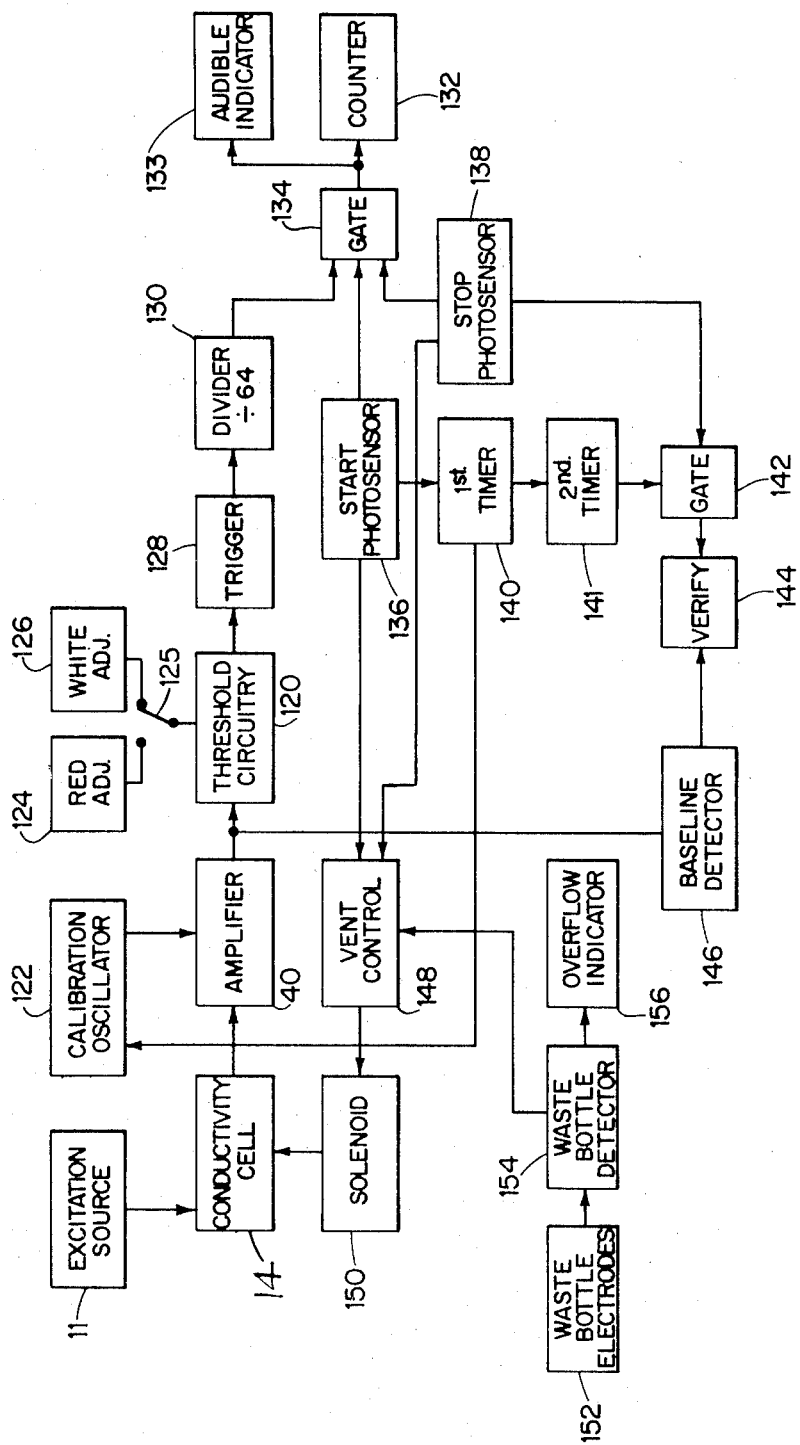
FIG. 6 is a block diagram of the system circuitry.

The system circuitry, according to the invention, is illustrated in FIG. 6. The conductivity cell 14 has its electrodes energized from a suitable regulated direct current source 11, and the electrodes are also coupled to the input of amplifier 40, the output of which is coupled to threshold circuitry 120. A calibration oscillator 122 is also coupled to amplifier 40, for reasons to be explained. The threshold circuitry 120 includes red cell adjustment control 124 and white cell adjustment control 126 which are operative to adjust the respective threshold levels for proper detection of red and white blood cells to the exclusion of spurious signals and noise. The appropriate threshold control is coupled to circuitry 120 by means of a switch 125 which is operative in conjunction with switch 112 upon insertion of a red cell or a white cell flask into the instrument. The proper threshold for red cell or white cell counting is thereby automatically set upon insertion of a corresponding sample flask.

The output signal from threshold circuitry 120 is coupled to a trigger circuit 128, the output of which is coupled to a divider 130. Divider 130 is employed to electronically divide the particle count pulses by a factor of 64 in order to reduce the pulse rate to within the counting rate of the electromechanical counter 132 employed in the illustrated embodiment. Of course, if an electronic counter or a higher speed counter were employed such electronic division circuitry would not be necessary. The slower speed counter has the advantage of considerably lower cost than presently available high-speed electronic counters. The particle count pulses are applied from divider 130 to counter 132 by way of a gate 134 which also receives input signals from a start photosensor 136 and a stop photosensor 138.

The divider 130 lowers the pulse count rate to a magnitude which, upon operation of electromechanical counter 132, provides audible indication of the count cadence. The operating noise of counter 132 provides a readily useful audible indication of a regular cadence such as would be provided by a proper analytical run, and correspondingly, an irregular cadence such as would be due to gas bubbles would indicate improper system operation. An audible indicator 133 can also be coupled to the output of gate 134 to provide a separate cadence indication for monitoring system operation. Such a separate audible indicator is useful for example where the particular counter being employed does not provide suitable aural indication for monitoring purposes.

As described hereinabove, the photosensors 136 and 138 are operative to provide a predetermined metering interval during which particles are counted such that a particle count is obtained for a predetermined volume of sample fluid. Photosensor 136 is also coupled to a time circuit 140, the output of which is coupled to calibration oscillator 122. The output of timer 140 is also coupled to a gate 142 which receives a second input signal from photosensor 138. The output of gate 142 is coupled to a verify indicator 144 which also receives an input signal from a baseline detector 146 which receives an input signal from the output of amplifier 40. Photosensors 136 and 138 are also coupled to vent control circuitry 148 which is operative to selectively energize solenoid 150 for control of the automatic venting of conductivity cell 10, as described hereinabove.

The waste bottle electrodes 152 are connected to a waste bottle level detector 154 which, in turn, is operative to energize a waste overflow indicator 156. Detector 154 is also coupled to vent control 148 to cause venting of the system in the event of an overflow condition. Detector 154 is of the latching type which remains activated even upon momentary sensing of an overflow level by electrodes 152. Since momentary detection of an overflow level would cause opening of the conductivity cell vent and consequent introduction of air within the system, an erroneous count would be accumulated which might go unnoticed by the system operator were it not noted that the overflow indicator had been momentarily illuminated. As implemented herein, any such momentary overflow-level sensing such as might occur by sloshing of the waste fluid in the waste bottle would cause latching of the overflow indicator to denote that either the waste bottle is full or that vent control 148 has been opened during a run. The overflow indicator 156 therefore also provides visual indication of a possibly erroneous count.

In operation, the presence of a particle within the aperture of cell 10 alters the impedance of the path through the aperture and the change in impedance causes a corresponding change in voltage level between the cell electrodes which is sensed by the high-input impedance, low-noise, high-gain amplifier 40. Amplifier 40 is AC coupled to the cell electrodes and is thus decoupled from DC level variations which may occur for example from conductivity changes within the sample solution. The current flowing between the cell electrodes need not be constant since the amplifier is AC coupled and thus does not respond to DC level changes.

The amplifier provides output pulses representative of the passage of particles through the metering aperture and these pulses are applied to threshold circuitry 120 which includes respective threshold adjustment controls 124 and 126 which are selectively coupled to the threshold circuitry by means of a switch 125. A predetermined threshold level is thereby provided for respective red and white blood cell counting such that only pulses above a predetermined threshold are passed for subsequent signal processing. Signals below the threshold level, attributable, for example, to noise are discriminated against by the threshold circuitry and are not processed.

The signal pulses from threshold circuitry 120 cause the generation of corresponding trigger pulses by circuitry 128 and these trigger pulses are divided by a factor of 64 by division circuitry 130. The pulse train from divider 130 is applied to gate 134 which is operative to apply the pulses to counter 132 in the simultaneous presence of a signal from photosensor 136 and to terminate the application of pulses to counter 132 upon receipt of a signal from photosensor 138. Counter 132 is thus caused to accumulate a count corresponding to the particles counted during the metering interval determined by the photosensors.

The signal provided by photosensor 136 is also applied to vent control 148 to cause solenoid 150 to close the vent port in cell 10 to permit the passage of sample fluid through the system for analysis. Vent control 148 is operative in the presence of a signal from photosensor 138 to deenergize solenoid 150 to open the vent port for subsequent purging of the system and to enable the system for a subsequent analytical run.

Photosensor 136 is also operative to commence the generation of a timing cycle for the determination of an acceptable count interval within which a particle count is accumulated. Photosensor 136 is coupled to a first timer 140 which in turn is coupled to a second timer 141, coupled in turn to gate 142. The first timer 140 is also coupled to the calibration oscillator 122. The operation of the timing interval is best illustrated in conjunction with the timing diagram of FIG. 7.

Referring to the timing diagram, it is noted that upon actuation of the count control 90, the counter is reset to zero and the vent solenoid is energized to close the conductivity cell vent to permit fluid to be drawn from the sample flask through the system. Upon passage of fluid past start photosensor 136, the counting operation commences as does the generation of a timing interval T1 by first timer 140. The timing interval T1 is of predetermined duration, upon the termination of which a timing interval T2 of second predetermined duration is generated by second timer 141.

The timing interval T1 is selected to be the minimum time within which a valid particle count can be accomplished, while timing interval T2 represents the predetermined tolerance range within which a count is acceptable. Gate 142 is closed for the period of the second timer 141 and thus the presence of a signal from stop photosensor 148 within the timing interval T2 does not cause actuation of the verify indicator 144 since the count in this event was performed within the acceptable tolerance range. When, however, a stop signal from photosensor 138 is received either before or after the generation of timing interval T2, then gate 142 causes activation of verify indicator 144 to denote an erroneous count interval. Such an erroneous count interval may be caused for example by a blocked aperture.

Figure 7:
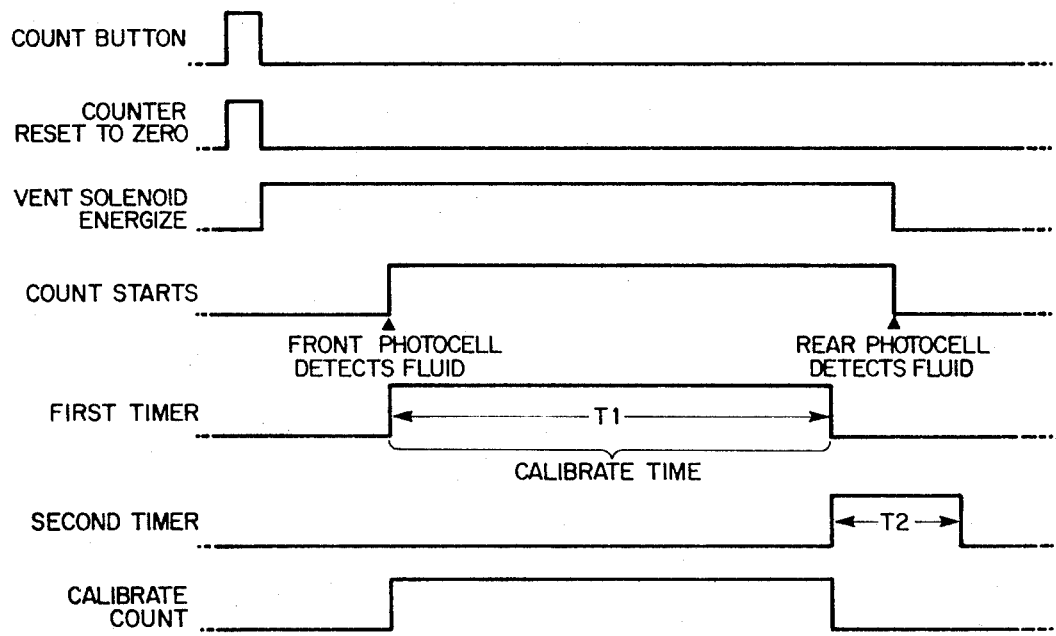
FIG. 7 is a timing diagram useful in describing operation of the verification circuitry of FIG. 6.

It is evident from FIG. 7 that the timing interval T1 is also the calibration time of the system, and during a calibration run, first timer 140 is operative to deenergize calibration oscillator 122 after such a run.

The amplifier 40 is continuously monitored to detect abnormal operation such as may be caused by gas bubbles within the sample fluid which can result in momentary baseline level changes which could be erroneously processed as particle counts. Such abnormal operation is detected by the baseline detector 146 which is sensitive or responsive to the spectrum and amplitude of input signals thereto. Changes caused by gas bubbles are often above the threshold level of the detection circuitry but have a lower frequency spectrum than valid count pulses. Detector 146 is operative to sense such low-frequency components and to indicate their presence by activation of verify indicator 144.

In order to calibrate the system, a nonparticle-containing saline solution is employed within a sample flask and the calibrate button 92 is depressed to commence a calibration run. Fluid is drawn through the system as described hereinabove and calibration pulses are provided by oscillator 122 to amplifier 40. These pulses are processed as described above and are gated with the photosensor metering circuitry, as in the case of actual particles, to provide a sample count which is a measure of normal system operation. In the presence of an abnormal count interval, as detected by timer 140, verify indicator 144 is illuminated to denote an erroneous system condition. Oscillator 122 is stopped by a signal from timer 140.

From consideration of the foregoing, it should be evident that particle counting and especially blood cell counting can be accomplished in a particularly efficient and precise manner. Analysis is essentially automatic. Insertion of a sample flask into the instrument automatically sets the red blood count or white blood count threshold level and decimal point output indication, and actuation of the count button causes the steady flow of sample fluid from the sample flask through the flow tube. Counting of particles within a predetermined volume of sample fluid is accomplished by optical metering sensors and upon completion of a particle count, the vent within the conductivity cell is automatically opened in order to break the vacuum and admit air through the vent to cause liquid remaining in the system to be rapidly purged into the waste bottle. Actuation of the count button again causes closure of the vent and automatically commences another counting sequence.

It will be appreciated that the threshold levels of the particle-counting system should be set to pass count pulses and to discriminate against spurious signals. A threshold which is too high will discriminate against some count pulses as well as unwanted signals, while a threshold which is too low will not effectively block spurious signals. The automatic threshold-plotting technique of the present invention is directed toward the efficient and accurate selection of an appropriate threshold level. The invention provides, from a single analytical run, a plot of count rate as a function of threshold voltage, from which threshold levels can be readily determined.

The automatic plotter according to the invention is shown in FIG. 8. The output signals from trigger circuit 128 are applied to a one-shot multivibrator 200 which is operative to provide normalized pulses corresponding in rate to the pulses received from trigger circuit 128. The normalized pulses are applied to a count rate detector 201 which produces a DC voltage output proportional to the rate of the count pulses being received. The output of rate detector 201 is applied to the Y-axis input of an XY plotter 202. A ramp generator 203 applies a sweep voltage to the X-axis input of the plotter 202, and also provides a threshold level signal to threshold circuitry 120. The threshold voltage from generator 203 varies over a range of possible threshold levels.

To plot a system threshold curve, a red blood cell sample is processed by the system as described above except that a variable threshold is provided by ramp generator 203 to cause generation of a red cell threshold plot on plotter 202, as depicted in FIG. 9. A similar white cell threshold plot is provided by processing of a white blood cell sample. An automatic plot of red cell and white cell threshold curves is thereby provided from a respective red cell and white cell counting run. As seen in FIG. 9, the curves represent count rate versus threshold voltage, and it can be readily determined by inspection of the curves what the proper threshold settings should be. The respective settings for threshold controls 124 and 126 (FIG. 6) should be at a point along the corresponding curve on the lower voltage end of the substantially flat portion thereof.

It is not intended to limit the invention by what has been particularly shown and described, except as indicated in the appended claims.

What is claimed is:

1. For use in a particle-counting system for counting particles suspended in a liquid and including means for providing electrical pulses in response to particles passing through an aperture through which particle-containing liquid is caused to flow, a method for providing an automatic threshold plot comprising the steps of:
   deriving from said electrical pulses a first signal representative of particle count rate;
   providing a sweep signal which includes a range of possible threshold voltages for said particle-counting system;
   applying said first and second signals to the respective axes of a two-axis plotter; and
   plotting a visual representation of count rate as a function of threshold voltage.

2. For use in a particle-counting system for counting particles suspended in a liquid and including means for providing electrical pulses in response to particles passing through an aperture through which particle-containing liquid is caused to flow, an automatic threshold plotter comprising:
   means operative in response to said electrical pulses to provide a first signal representative of particle count rate;
   means for providing a sweep signal which encompasses a range of possible threshold voltages for said particle-counting system;
   a two-axis plotter; and
   means for applying said first and second signals to respective axes of said plotter; and said plotter being operative to provide a visual representation of count rate versus threshold voltage for said particle-counting system.

3. The invention according to claim 2 wherein said electrical pulse responsive means comprises a one-shot multivibrator operative in response to said electrical pulses to provide normalized signal pulses; and a count rate detector operative in response to said normalized signal pulses to provide an output signal representative of particle count rate.

4. The invention according to claim 3 wherein said sweep signal means includes a ramp generator.

5. The invention according to claim 4 wherein said plotter is an electromechanical XY plotter, said first and second signals being respectively applied to the Y-axis and X-axis of said plotter.

6. The invention according to claim 2 wherein said sweep signal means includes a dual ramp generator for providing first and second sweep signals, said plotter being operative to provide a visual representation of particle size distribution versus threshold voltage.

* * * * *